(No Model.)
J. J. STEIGER.
TRACTION WHEEL.
No. 386,169. Patented July 17, 1888.
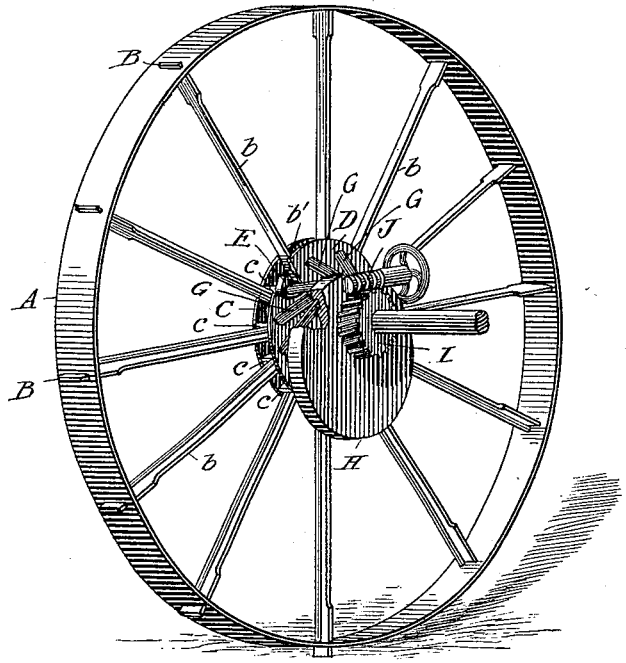
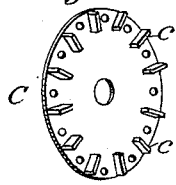
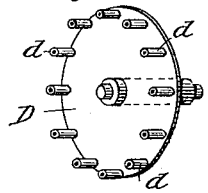
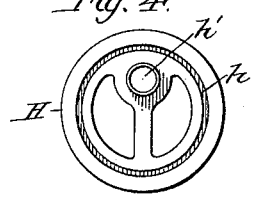
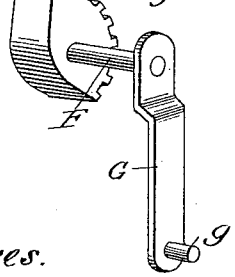
Witnesses.
James M. Matthews.
D. P. Wright.
Inventor
John J. Steiger.
by Wiles, Greene & Mead
att'ys

UNITED STATES PATENT OFFICE.

JOHN J. STEIGER, OF PEORIA, ILLINOIS.

TRACTION-WHEEL.

SPECIFICATION forming part of Letters Patent No. 386,169, dated July 17, 1888.

Application filed February 14, 1887. Renewed February 16, 1888. Serial No. 264,186. (No model.)

*To all whom it may concern:*

Be it known that I, JOHN J. STEIGER, a citizen of the United States, residing at Peoria, in the county of Peoria and State of Illinois, have invented certain new and useful Improvements in Traction-Wheels; and I do hereby declare that the following is a full, clear, and exact description of the invention, which will enable others skilled in the art to which it appertains to make and use the same.

This invention relates to traction-wheels of that class in which a series of approximately-radial arms are automatically moved outward from and inward toward the center of the wheel as the latter rotates, the outer end of each of said arms when at its outermost limit of motion being projected through the tire of the wheel.

The invention is fully described and explained in this specification and shown in the accompanying drawings, in which—

Figure 1 represents a perspective view of the wheel. Fig. 2 is a detail view showing a portion of the hub. Fig. 3 is a detail view showing that portion of the hub in which the lever operating the projections from the tire is operated. Fig. 4 is a view showing the cam by which the position of the projections are regulated. Fig. 5 is a detail view showing the device for transmitting motion from the cam to the projections, and Fig. 6 is a detail view showing the projection and its stem by which it is carried.

In the drawings, A represents the tire of the wheel, which is provided at intervals with holes $a$, which receive the projections B. The tire is connected to the sections C and D of the hub by means of spokes A', which are secured at their outer ends to the tire and at their inner ends to the hub.

The section C of the hub is provided with a series of projections, $c$, arranged in a circle and of a length sufficient to retain the sections apart a distance sufficient to allow the introduction of the stems $b$ of the projections B and the segment E between the two sections of the hub. The section D of the hub is attached to the spokes, and is provided with a series of projections, $d$, having holes for the reception of pins F, bearing the toothed segment E. The inner ends of the projections are provided with racks $b'$, which engage with segments, by the movement of which the projections are moved. The segment E is operated by the cam H, having a groove, $h$, in which run bowls or rollers $g$, mounted on projections from the arms G. The arms G are connected to the segments E by means of the pin F to which the segment is fixed, so that a vibratory motion of the arm G effects a sliding of the projecting arms B.

The cam H is connected to the wheel by passing the axle thereof through the opening $h'$ in the plate H, and as this opening is eccentric with reference to the wheel the positions of the arms B are, by reason of the engagement with the segment operated by the cam, different at different parts of the revolution of the wheel. The arms whose operating-arms are in engagement with those portions of the groove farther from the axle are moved outward from the center of the wheel and project farthest from the tire, while those having their operating-arms in engagement with that portion of the groove nearest the axle are drawn down flush with the tire. The arms in engagement with parts of the groove intermediate between the points mentioned project beyond the tire distances according to their positions.

The grooved plate H is retained against turning with other parts of the wheel, and its position is regulated by means of a spur-wheel, I, secured to the plate, and a worm-gear, J, secured to the frame to which the axle is connected. By means of this gear J the parts may be so adjusted that any desired part of the tire may be smooth, or so that the radial arms may project the greatest distance from any desired part.

I am aware that it has been proposed to provide a traction-wheel with a series of arms adapted to be projected and retracted and with an adjustable cam engaging directly with the inner ends of said arms and adapted to actuate them. So far as I know, however, it is wholly new in such a structure to form racks on the inner ends of said arms and to combine with them a series of levers bearing toothed segments which engage the racks, said segment-bearing levers being actuated by the cam. I believe it to be new, also, to make the cam eccentric with reference to the wheel and to combine with it means whereby it may be rotated about the axle of the wheel and fastened in any desired position whatever for the purpose of giving the arms the greatest projection at any desired point in the periphery of the wheel.

What I claim as new, therefore, and desire to secure by Letters Patent, is—

1. A traction-wheel provided with sliding radial arms projecting from the periphery of the wheel, rotating shafts provided with geared segments meshing with indentations in the sliding arms, and a cam for imparting motion to the segment.

2. A traction-wheel provided with sliding radial arms and with a tire having holes for the reception of the arms, each of said radial arms being provided with racks, segments meshing with the said racks, and an eccentric or cam connected with the segments and operating the sliding arms, whereby the sliding arms are caused to project and retreat, substantially as described.

3. A traction-wheel provided with sliding radial arms provided at their inner ends with racks, a tire for the reception of the arms, segments meshing with the racks, and a shifting eccentric or cam operating the segments, whereby the projection and retreat of the arms relative to the revolution of the wheel are regulated.

4. A traction-wheel consisting of the tire provided with holes, the sliding radial arms resting in the holes, the segments mounted on the shafts, provided with the arm having the bowls, and the plate H, provided with the groove $h$, arranged eccentrically, mounted relative to the wheel.

5. A traction-wheel consisting of the tire provided with the holes, the spokes, the hub made in parts, the sliding arms having their outer ends resting in the holes and their inner ends provided with racks, the segments gearing with the racks and mounted on the shafts F, the arm G, provided with the bowls, and the plate provided with the eccentric groove receiving the bowls, substantially as described.

6. A traction-wheel comprising a tire provided with holes, sliding radial arms provided on their inner ends with racks, and the segmental racks connected with the eccentric groove in the plate H, and a circular rack and worm for shifting the plate and regulating the position at which the radial arms project and retreat relative to the revolution of the wheel.

In testimony whereof I affix my signature in presence of two witnesses.

JOHN J. STEIGER.

Witnesses:
　DAVID H. MEAD,
　A. KEITHLEY.